(12) United States Patent
de Chazal

(10) Patent No.: US 8,328,581 B2
(45) Date of Patent: Dec. 11, 2012

(54) IN-LINE FUSED CONNECTOR

(75) Inventor: Aaron James de Chazal, Rochester, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 143 days.

(21) Appl. No.: 12/938,758

(22) Filed: Nov. 3, 2010

(65) Prior Publication Data

US 2012/0108106 A1    May 3, 2012

(51) Int. Cl.
*H01R 13/68* (2011.01)
(52) U.S. Cl. ............... 439/620.28; 439/620.31
(58) Field of Classification Search ............ 439/620.26, 439/620.28, 620.29, 620.3, 620.33, 366; 439/620.31
See application file for complete search history.

(56) References Cited

U.S. PATENT DOCUMENTS

| | | | |
|---|---|---|---|
| 1,974,700 A * | 9/1934 | Dill | 337/198 |
| 1,990,176 A * | 2/1935 | Fried | 337/197 |
| 2,644,056 A * | 6/1953 | Curtis | 337/198 |
| 2,676,223 A * | 4/1954 | Whitaker | 337/197 |
| 2,988,617 A * | 6/1961 | Graziosi | 337/197 |
| 3,218,413 A | 11/1965 | Poehlman, Jr. | |
| 3,320,383 A | 5/1967 | Koetter | |
| 3,924,914 A | 12/1975 | Banner | |
| 4,178,061 A | 12/1979 | Ahroni | |
| 4,275,374 A * | 6/1981 | Chaucer | 337/197 |
| 4,408,822 A | 10/1983 | Nikitas | |
| 4,426,127 A | 1/1984 | Kubota | |
| 4,575,704 A | 3/1986 | Pezold | |
| 5,137,473 A | 8/1992 | Nickola | |
| 5,419,719 A | 5/1995 | Chandler | |
| 6,039,607 A | 3/2000 | Cheung | |
| 7,613,003 B2 | 11/2009 | Pavlovic et al. | |
| 7,789,690 B1 | 9/2010 | Rhein | |
| 7,811,115 B1 | 10/2010 | Tyler | |
| 7,985,098 B2 * | 7/2011 | De Chazal et al. | 439/620.31 |
| 2003/0001715 A1 | 1/2003 | Montague | |
| 2005/0128045 A1 | 6/2005 | Lin | |
| 2008/0303625 A1 | 12/2008 | Ding | |
| 2010/0124834 A1 | 5/2010 | De Chazal et al. | |
| 2010/0227505 A1 | 9/2010 | Markyvech | |
| 2011/0151719 A1 * | 6/2011 | DeWitte | 439/620.26 |
| 2012/0094509 A1 * | 4/2012 | Bryan et al. | 439/76.1 |

FOREIGN PATENT DOCUMENTS

DE        19727453        1/1999

(Continued)

OTHER PUBLICATIONS

International Search Report, International Application No. PCT/US2011/001840, International Filing Date, Jan. 11, 2011.

*Primary Examiner* — Hae Moon Hyeon

(57) ABSTRACT

An in-line fused connector includes an outer housing and a fuse subassembly disposed in the outer housing. The fuse subassembly includes a mating terminal that is configured to engage a first conductive body of the power distribution module and an internal terminal coupled with the fused conductor that electrically couples with an electronic device. The mating terminal and the internal terminal are shaped to receive a fuse to electrically couple the mating terminal and the internal terminal. Electric current that is supplied by the power distribution module is conveyed through the fuse subassembly when the fuse subassembly receives the fuse and the mating terminal of the fuse subassembly mates with the first conductive body of the power distribution module through an opening in the front end of the housing. The fuse is removable from the fuse subassembly through the front end.

20 Claims, 5 Drawing Sheets

FOREIGN PATENT DOCUMENTS

| | | |
|---|---|---|
| GB | 2 282 713 A | 4/1995 |
| GB | 2284510 | 6/1995 |
| JP | 3 074065 A | 3/1991 |
| WO | WO 2010/068293 A1 | 6/2010 |

* cited by examiner

IN-LINE FUSED CONNECTOR

BACKGROUND OF THE INVENTION

The present invention relates to a connector assembly, such as a connector assembly for use in high voltage applications.

Increased fuel costs and increased efforts at reducing environmental pollution have lead the automotive industry towards electric and hybrid electric vehicles (HEV). One design aspect of these vehicles is the consideration for the high operating voltage. Consequently, specific components of the vehicles must be designed to accommodate the high voltage. The electronic devices of these vehicles include components that operate at high voltages and require high voltage pathways including connectors. For example, some known electrical vehicular assemblies include electronic loads, such as air conditioning compressors, auxiliary heaters, and the like, that operate using up to 600 volts.

In connector applications that use high voltage, special requirements exist for providing safety to users and to prevent damage to other assembly components and the connectors themselves. For example, if a connector is unmated under active high voltage power, at the instant the mating conductors of the high voltage connector disconnect, the high voltage power may cause severe damage to the connector. Consequently, in some applications, a high-voltage interlock (HVIL) circuit is used to protect the connectors and other assembly components from damage due to the high voltage power. An HVIL circuit controls the high voltage power so that the high voltage power is not active at the mating and unmating of the high voltage conductors. In a connector assembly with an HVIL circuit, the sequence of mating and unmating the high voltage conductors and the mating and unmating of the HVIL contacts is controlled to prevent injury to users or damage to the components. For example, an HVIL circuit may ensure that the high voltage conductors are mated prior to the HVIL contacts and thus prior to activating the high voltage power and, the HVIL contacts are unmated, which deactivates the high voltage power, prior to (and after a preferred delay) the unmating of the high voltage conductors.

Due to the lack of alternative placement options, some known high voltage systems provide fuses inside power distribution modules. The power distribution modules include power sources, such as batteries, that supply electric current to the electronic devices. Placing or replacing the fuses inside the power distribution module typically requires opening of a cover of the module and removal of one or more components inside the module. For example, the fuses may not be easily accessible inside the module.

A need exists for a connector that electrically couples one or more electronic devices with a power distribution module while providing a more easily accessible and replaceable fuse.

BRIEF DESCRIPTION OF THE INVENTION

In one embodiment, an in-line fused connector is provided. The connector includes an outer housing having a front end and a fuse subassembly. The fuse subassembly is disposed in the outer housing. The fuse subassembly includes a mating terminal that is configured to engage a first conductive body of the power distribution module and an internal terminal coupled with the fused conductor that is configured to be coupled with a fused conductor that is configured to be electrically coupled with an electronic device. The mating terminal and the internal terminal are shaped to receive a fuse to electrically couple the mating terminal and the internal terminal. Electric current that is supplied by the power distribution module is conveyed through the fuse subassembly when the fuse subassembly receives the fuse and the mating terminal of the fuse subassembly mates with the first conductive body of the power distribution module through an opening in the front end of the housing. The fuse is removable from the fuse subassembly through the front end.

In another embodiment, another in-line fused connector is provided. The connector includes an outer housing, an interlock terminal, a fused conductor, and a fuse subassembly. The interlock terminal is disposed within the outer housing and is configured to mate with interlock conductors of a power distribution module to close an interlock circuit. The fused conductor is at least partially disposed in the outer housing and is configured to be electrically coupled with an external electronic device. The fuse subassembly is disposed in the outer housing and includes a mating terminal and an internal terminal. The mating terminal is configured to engage a first conductive body of the power distribution module. The internal terminal is electrically coupled with the fused conductor. The fuse subassembly removably receives a fuse between the mating terminal and the internal terminal. The fuse subassembly closes a power supply circuit that includes the power distribution module and the electronic device when the fuse is received by the fuse subassembly and the interlock circuit is closed.

In another embodiment, another in-line fused connector is provided. The connector includes an outer housing, a fused conductor, and a fuse subassembly. The outer housing has a front end that frames an opening. The fused conductor is at least partially disposed in the outer housing and is configured to be electrically coupled with an external electronic load. The fuse subassembly is disposed in the outer housing and includes a mating terminal and an internal terminal. The mating terminal is configured to engage a first conductive body of a power distribution module through the opening of the outer housing. The internal terminal is coupled with the fused conductor. The mating terminal and the internal terminal are positioned to removably receive a fuse that electrically couples the mating terminal with the internal terminal to electrically join the power distribution module with the external electronic module. The fuse is removable from the fuse subassembly through the opening of the outer housing.

DETAILED DESCRIPTION OF THE INVENTION

Figure 1:
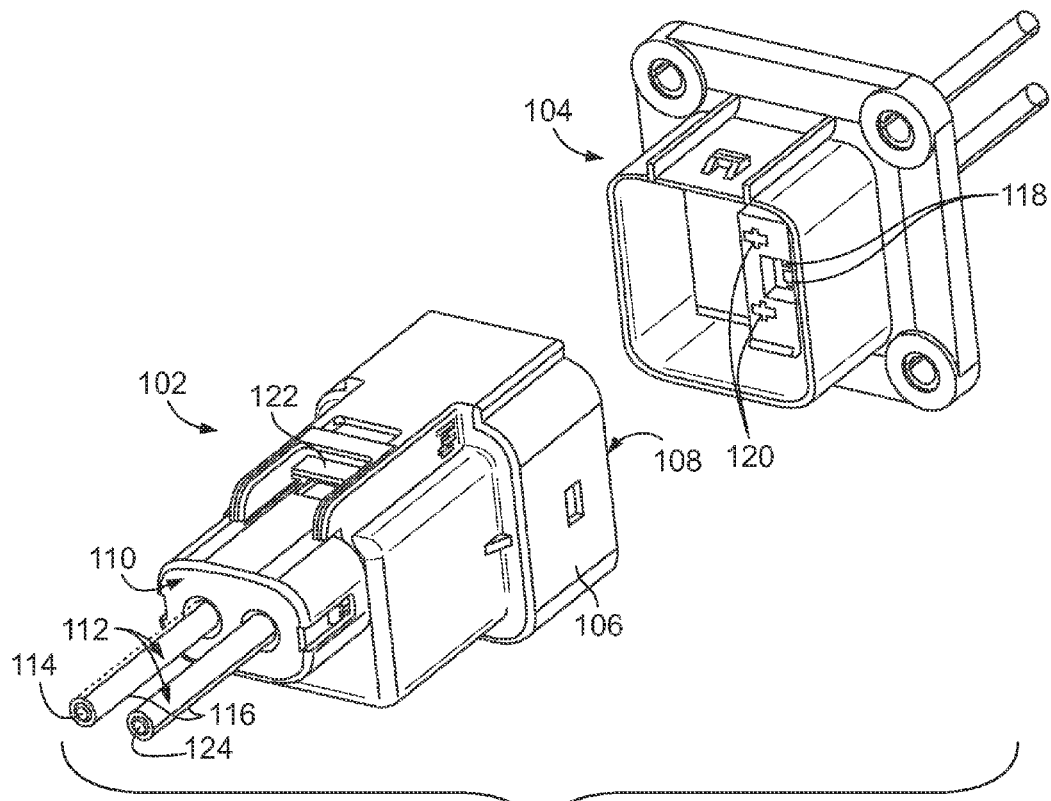
FIG. 1 is a perspective view of one embodiment of an unmated connector assembly.

FIG. 1 is a perspective view of one embodiment of an unmated connector assembly 100. The connector assembly 100 is a high voltage connector assembly in one embodiment. For example, the connector assembly 100 may be capable of transferring electric power or current at voltages of at least 42 volts, at least 600 volts, or at lesser voltages. The connector assembly 100 may be used in conjunction with a vehicle, such as an automobile, to transfer electric current between two or more electronic devices or modules in an automobile.

The connector assembly 100 includes an in-line fused connector 102 and a header subassembly 104. The in-line fused connector 102 and the header subassembly 104 mate to transfer relatively high voltage electric power therebetween. The header subassembly 104 can be part of a power distribution module, such as by being mounted to the exterior surface of a device in an automobile that includes or acts as a power source to supply electric current one or more electronic devices. The in-line fused connector 102 is electrically coupled with one or more of the electronic devices and mates with the header subassembly 104 to couple the electronic device with the power distribution module.

The in-line fused connector 102 is referred to as "in-line" because the connector 102 mates with the header subassembly 104 to establish a fused conductive pathway, or a conductive pathway having a fuse, that extends through the connector 102 from the header subassembly 104 to an electric device that is coupled with the connector 102. The electronic devices receive and are powered by electric current supplied by the power distribution module and conveyed through the mated connector assembly 100. By way of example, the electronic devices may include air conditioning units, heating units, and other devices disposed within an automobile.

In the illustrated embodiment, the connector 102 includes an outer housing 106 that longitudinally extends between a front end 108 and an opposite back end 110. The front end 108 engages and mates with the header subassembly 104. In the illustrated embodiment, several cables 112 extend through the back end 110 of the outer housing 106. The cables 112 include conductors 114, 124 enclosed within insulative jackets 116. The conductors 114, 124 are electrically coupled with one or more electronic devices. The conductor 114 may be referred to as a fused conductor 114 as the fused conductor 114 is electrically coupled with a fuse. The conductor 124 may be referred to as a feed through or unfused conductor as the conductor 124 is not electrically coupled with a fuse in one embodiment.

The header subassembly 104 defines a shroud that encircles several conductive bodies of the power distribution module to which the header subassembly 104 is mounted. The conductive bodies include interlock conductors 118 and first and second power supply conductive bodies 120. As described below, the interlock conductors 118 mate with terminals of the connector 102 to close an interlock circuit and the power supply conductive bodies 120 mate with other terminals of the connector to close a power supply circuit. The interlock circuit controls when electric current is supplied through the power supply circuit. For example, in one embodiment, the power distribution module to which the header subassembly 104 is mounted only conveys electric current through the power supply circuit when the interlock circuit is closed.

Figure 2:
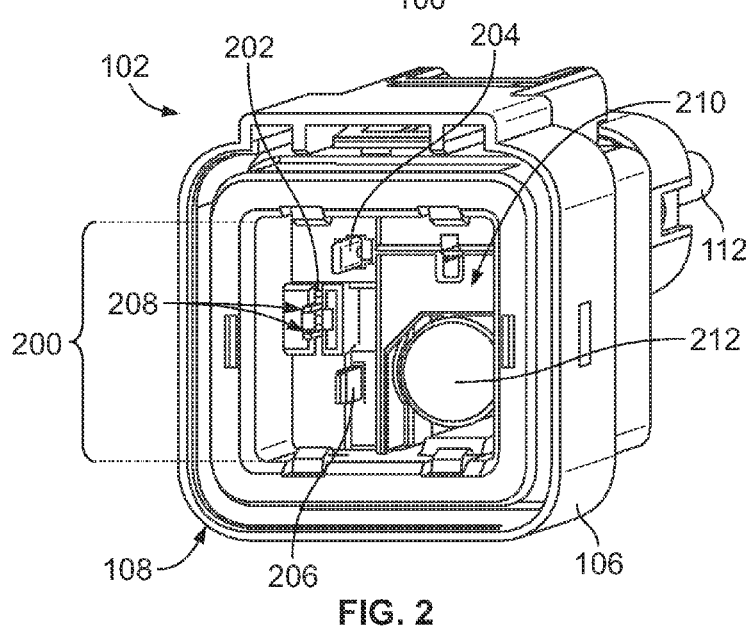
FIG. 2 is a front perspective view of one embodiment of the in-line fused connector.

FIG. 2 is a front perspective view of one embodiment of the in-line fused connector 102. The front end 108 of the outer housing 106 of the connector 102 frames a mating opening 200. The conductive bodies of the header subassembly 104 (shown in FIG. 1) mate with the conductive terminals of the connector 102 through the mating opening 200 of the outer housing 106.

In the illustrated embodiment, the conductive terminals of the connector 102 include an interlock terminal 202 and two mating terminals 204, 206. Alternatively, a different number of one or more of the terminals 202, 204, 206 may be provided. The interlock terminal 202 is a single conductive body, or shunt, that includes a plurality of mating extensions 208. The mating extensions 208 mate with the interlock conductors 118 (shown in FIG. 1) of the header subassembly 104 (shown in FIG. 1) to close the interlock circuit described above.

The mating terminals 204, 206 include a feed through mating terminal 204 and a fused mating terminal 206. The mating terminals 204, 206 are conductive bodies that are electrically coupled with the conductors 114, 124 (shown in FIG. 1) of the cables 112. The mating terminals 204, 206 mate with the power supply conductive bodies 120 (shown in FIG. 1) of the header subassembly 104 (shown in FIG. 1) to close the power supply circuit described above. Electric current is supplied through the mated terminals 204, 206 to power the electric device that is coupled with the connector 102.

The connector 102 includes a fuse subassembly 210 that is at least partially disposed within the outer housing 106. The fuse subassembly 210 provides a fused conductive pathway that extends through the connector 102 to one or more electric devices coupled with the connector 102. In the illustrated embodiment, the fuse subassembly 210 includes the fused mating terminal 206 and a fuse 212. As shown and described below, the fused mating terminal 206 is electrically coupled with the fuse 212 such that electric current that is conveyed from the header subassembly 104 to the fused mating terminal 206 passes through the fuse 212 before passing through at least one of the cables 112 to the electric device.

The fuse 212 provides additional protection to the electric device. For example, the fuse 212 may be rated to fail, or "blow," when the magnitude or energy of the current supplied through the fuse 212 exceeds a threshold associated with the electric device. The threshold may be sufficiently low that current flowing through the fuse 212 without blowing the fuse 212 does not damage the electric device. When the fuse 212 blows, a conductive pathway provided by the fuse subassembly 210 and that electrically couples the fused mating terminal 206 with the electric device is broken, or opened, to prevent continued flow of current to the electric device.

In the illustrated embodiment, the fuse subassembly 210 removably receives the fuse 212. By "removably receive," it is meant that the fuse 212 can be removed from the fuse subassembly 210 and replaced with another fuse 212. For example, after a first fuse 212 blows, the conductive pathway that couples the fused mating terminal 206 with the electric device is opened. The first fuse 212 can be manually removed from the fuse subassembly 210 and swapped out with a second fuse 212 that has not blown to reestablish the conductive pathway between the fused mating terminal 206 with the electric device.

The fuse 212 is removed and a new fuse 212 is loaded into the fuse subassembly 210 through the opening 200 in the front end 108 of the outer housing 106 in the illustrated embodiment. A tool, such as a flattened body having an upwardly extending spring finger or protrusion, may be manually inserted into the fuse subassembly 210 through the opening 200 and into a gap below the fuse 212 to grab and pull the fuse 212 out of the fuse subassembly 210. The new fuse 212 may be manually inserted into the fuse subassembly 210.

Figure 3:
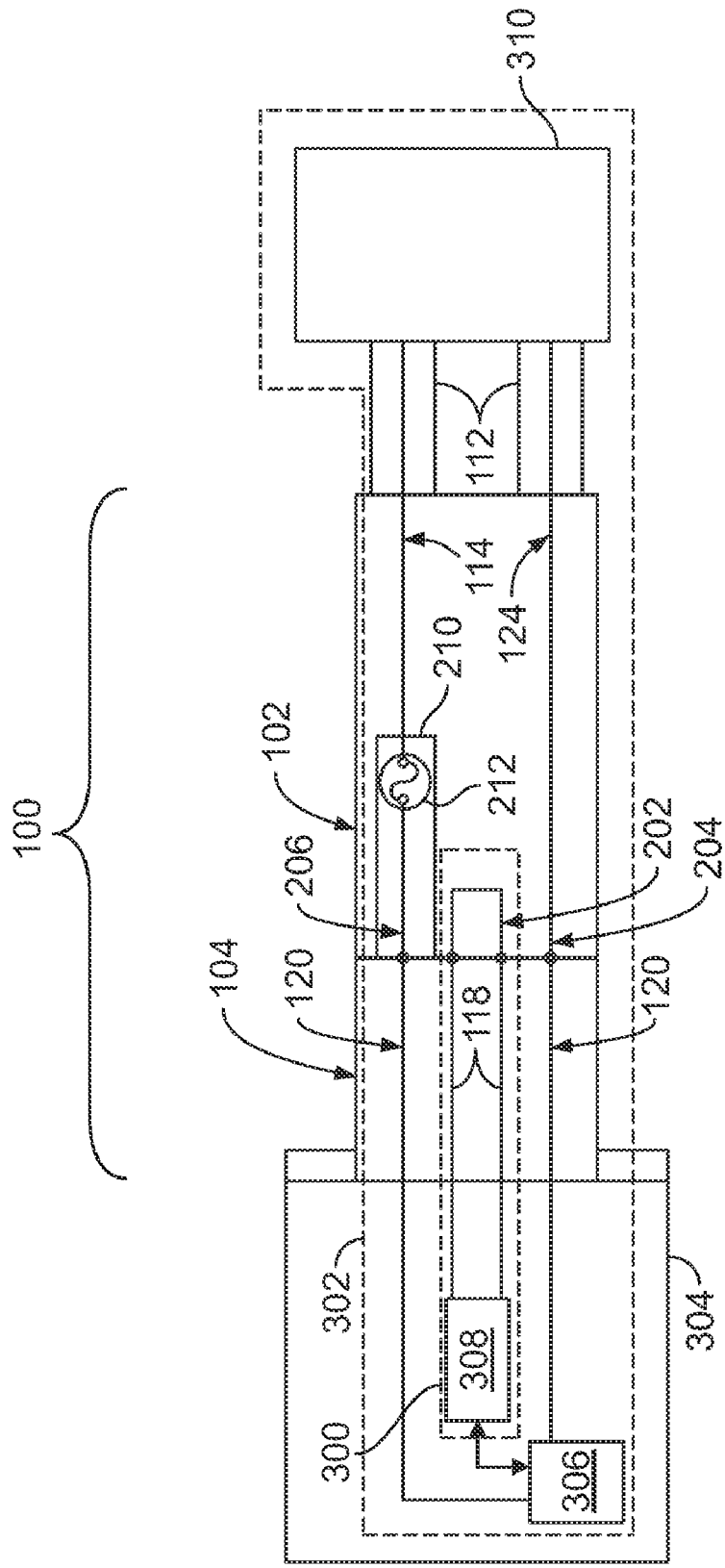
FIG. 3 is a circuit diagram of one embodiment of an interlock circuit and a power supply circuit formed by the mated connector assembly.

FIG. 3 is a circuit diagram of one embodiment of an interlock circuit 300 and a power supply circuit 302 formed by the mated connector assembly 100. The circuit diagram illustrates how the connector assembly 100 controls the transfer of power between the connector 102 and the header subassembly 104.

The header subassembly 104 is mounted to a power distribution module 304 that includes a power source 306 and a power control module 308. Alternatively, the power source 306 may be external to the power distribution module 304. For example, the power source 306 may be located outside of the power distribution module 304 such that the power source 306 and the power distribution module 304 are not disposed within the same common housing or enclosure. The power source 306 may be an independent source of electric current, such as a rechargeable battery. The power source 306 may be a high voltage power source, such as a battery that supplies at least 15 volts of alternating current or at least 30 volts of direct current. In another embodiment, the power source 306 is a high voltage power source that supplies a high voltage direct current of at least 42 volts of direct current up to 600 volts of direct current. Alternatively, the power source 306 may supply high voltage direct current of a greater amount.

The power control module 308 is embodied in or includes a logic-based device that communicates with the power source 306 to control when the power source 306 conveys electric current along the power supply circuit 302. The power control module 308 may include a microcontroller, processor, microprocessor, computer, and/or software operating on a processor, microprocessor, or computer. The power control module 308 is electrically coupled with the interlock conductors 118 of the header subassembly 104. The power control module 308 monitors the interlock circuit 300 to determine when the interlock circuit 300 is closed. For example, the power control module 308 can monitor the interlock conductors 118 to determine when the interlock conductors 118 are mated with the interlock terminal 202 of the connector 102. As described above, the interlock terminal 202 can be a single conductive body, such as a shunt, that electrically couples the interlock conductors 118 with each other when the interlock terminal 202 mates with the interlock conductors 118. As a result, the interlock circuit 300 is closed by the interlock terminal 202.

The power control module 308 directs the power source 306 to transmit electric current along the power supply circuit 302 when the interlock circuit 300 is closed. Conversely, the power control module 308 directs the power source 306 to stop transmitting electric current along the power supply circuit 302 when the interlock circuit 300 is open. In one embodiment, the interlock circuit 300 is a high voltage interlock circuit (HVIL) that controls when high voltage current is conveyed along the power supply circuit 302.

In one embodiment, connector 102 and the header subassembly 104 mate such that the interlock circuit 300 is opened or closed at a different time than the power supply circuit 302 is opened or closed. For example, the interlock terminal 202 of the connector 102 may be positioned farther from the front end 108 than the mating terminals 204, 206 of the connector 102 such that the interlock terminal 202 mates with the interlock conductors 118 and closes the interlock circuit 300 after the mating terminals 204, 206 mate with the power supply conductive bodies 120 of the header subassembly 104 to close the power supply circuit 302. Similarly, the interlock terminal 202 and the mating terminals 204, 206 may be positioned in the connector 102 such that the mating terminals 204, 206 unmate or decouple from the power supply conductive bodies 120 to open the power supply circuit 302 before the interlock terminal 202 unmates or decouples from the interlock conductors 118 to open the interlock circuit 300. This sequential mating and unmating results in the interlock circuit 300 being closed before the power supply circuit 302 is closed and the interlock circuit 300 being opened after the power supply circuit 302 is opened. The sequential mating and unmating allows electronic components disposed along the power supply circuit 302, such as capacitors, to sufficiently discharge built up electric charge to prevent arcing when the power supply circuit 302 is opened.

Alternatively or in addition to the relative positions of the interlock conductor 202 and the mating terminals 204, 206, the connector 102 may include one or more latches to close the interlock circuit 300 after the power supply circuit 302 is closed and open the interlock circuit 300 after the power supply circuit 302 is opened. For example, returning to the discussion of the connector 102 shown in FIG. 1, the connector 102 can include a multi-stage latch 122 that provides a time delay between the opening of the power supply circuit 302 and the opening of the interlock circuit 300 during unmating or decoupling of the connector assembly 100. For example, the latch 122 may be similar to the floating latch 4 shown and described in U.S. Pat. No. 7,811,115, entitled "Connector Assembly With Two Stage Latch" (the "'115 Patent"). The entire disclosure of the '115 Patent is incorporated by reference herein in its entirety. The latch 122 can enable the mating terminals 204, 206 (shown in FIG. 2) of the connector 102 to remain mated with the power supply conductors 120 of the header subassembly 104 for a time period after the interlock terminal 202 (shown in FIG. 2) of the connector 102 is unmated or decoupled from the interlock conductors 118 of the header subassembly 104. As a result, the latch 122 causes the power supply circuit 302 (shown in FIG. 3) to remain closed after the interlock circuit 300 (shown in FIG. 3) is opened for a least a brief time period to allow built up electric charge in capacitive components of the power supply circuit 302 to discharge.

Returning to the discussion of the interlock power supply circuit 300 and the power supply circuit 302 shown in FIG. 3, the connector 102 is coupled with an electric device 310, such as an electric device that is powered by the power distribution module 304. The power supply circuit 302 includes a plurality of conductive pathways extend through the connector 102 between the power supply conductive bodies 120 of the header subassembly 104 and the electronic device 310. These conductive pathways include a fused conductive pathway and a non-fused conductive pathway. The fused conductive pathway is at least partially provided by the fuse subassembly 210 and one or more conductive bodies that electrically couple the fuse subassembly 210 with the electric device 310, such as the conductor 114 extending through one of the cables 112. The fused conductive pathway extends from the fused mating terminal 206, through the fuse 212, and through the conductor 114 to the electric device 310.

The non-fused conductive pathway is at least partially provided by the mating terminal 204 and one or more conductive bodies that electrically couple the mating terminal 204 with the electronic device 310, such as the conductor 124 extending through another cable 112. The non-fused conductive pathway extends from the mating terminal 204 to the electronic device 310 through the feed through conductor 124.

When the interlock circuit 300 and the power supply circuit 302 are closed, the power source 306 delivers electric current through the power supply circuit 302 and the fuse subassembly 210 to power the electronic device 310. The fuse 212 of the fuse subassembly 210 protects the electronic device 310 from aberrations in the electric current so that the electronic device 310 is not damaged from the spikes or surges in the current. As described above, if the fuse 210 blows, the fuse 210 may be manually replaced with a new fuse 210 so that the connector 102 can be reused to supply current to the electric device 310.

Figure 4:
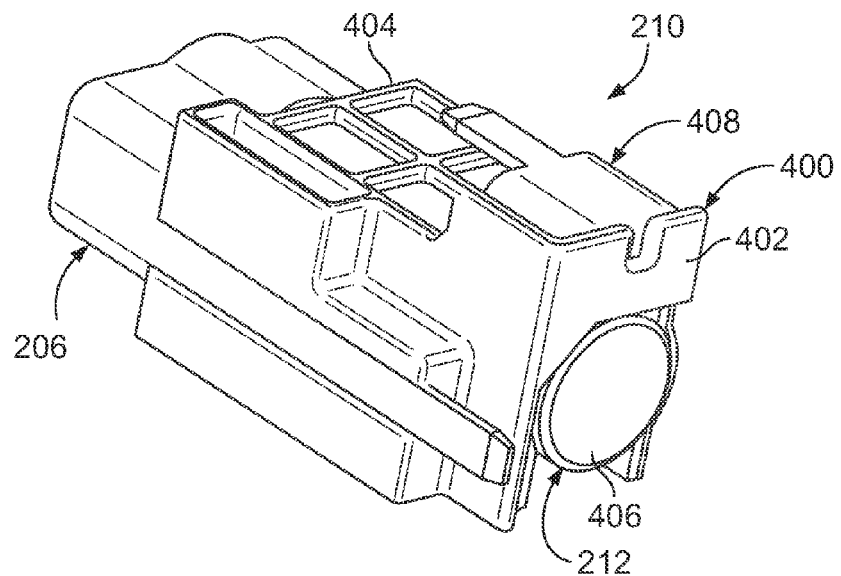
FIG. 4 is a perspective view of one embodiment of a fuse subassembly shown in FIG. 2.
Figure 5:
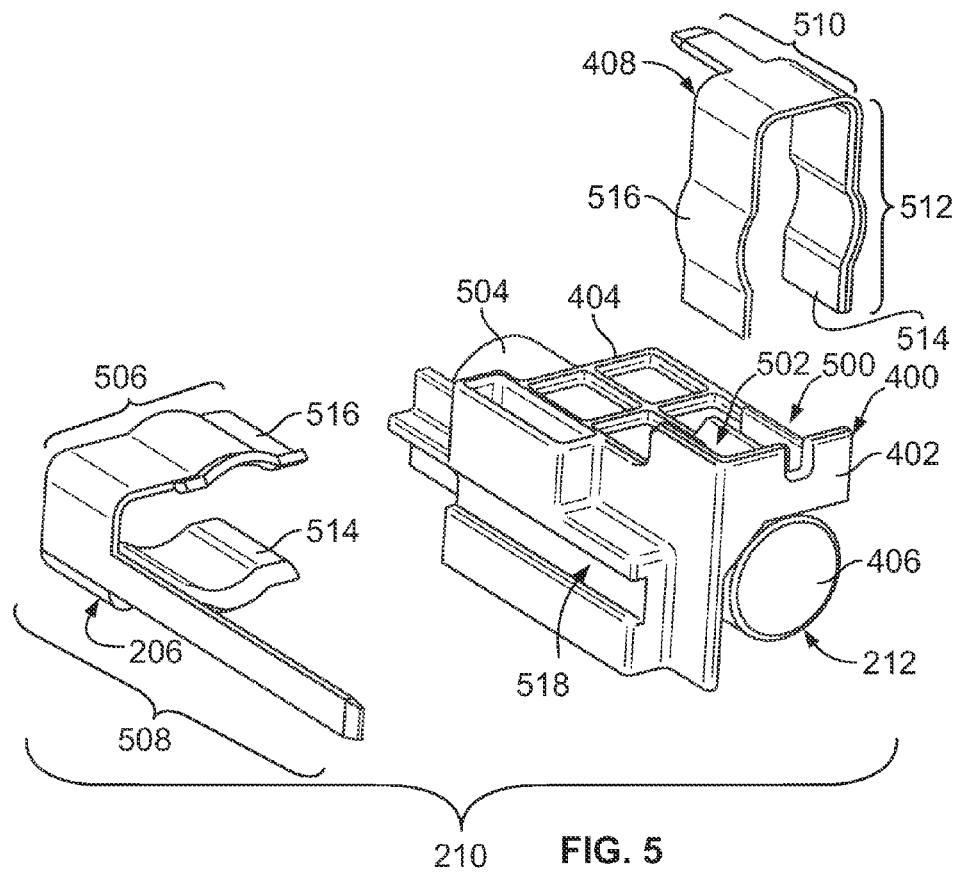
FIG. 5 is an exploded view of the fuse subassembly shown in FIG. 4.

FIG. 4 is a perspective view of one embodiment of the fuse subassembly 210. FIG. 5 is an exploded view of the fuse subassembly 210 shown in FIG. 4. The fuse subassembly 210 includes a fuse insert 400 that receives the fuse 212. In the illustrated embodiment, the fuse 212 is a cylindrical cartridge fuse having conductive caps 406, 504 (shown in FIG. 5) on opposite ends of the fuse 212. Alternatively, a different type of fuse 212 may be used. The fuse insert 400 extends between opposite front and back ends 402, 404. At the front end 402, the fuse insert 400 includes channels 500, 502 that extend through the fuse insert 400. One end cap 406 of the fuse 212 is accessible through the channels 500, 502. At the back end 404, the opposite end cap 504 (shown in FIG. 5) of the fuse 212 is exposed.

The fuse subassembly 210 includes the fused mating terminal 206 and an internal terminal 408. The terminals 206, 408 include, or are formed from, conductive materials, such as one or more metals or metal alloys. As shown in FIG. 5, the terminals 206, 408 include coupling segments 506, 512 coupled with corresponding mating segments 508, 510. In the illustrated embodiment, each of the coupling segments 506, 512 includes opposing spring fingers 514, 516 (shown in FIG. 5) that are shaped to receive one of the end caps 406, 504 of the fuse 212.

The spring fingers 514, 516 of the mating terminal 206 engage the exposed end cap 504 of the fuse 212 at or near the back end 404 of the fuse insert 400 in the illustrated embodiment. The spring fingers 514, 516 of the internal terminal 408 are inserted into the channels 500, 502 at or near the front end 402 of the fuse insert 400 to engage the opposite end cap 406 of the fuse 212. The spring fingers 514, 516 of each terminal 206, 408 are shaped and positioned to receive one end cap 406, 504 of the fuse 212 through a snap-fit connection. For example, each end cap 406, 504 may be slightly larger than the space between the opposing spring fingers 514, 516. The end caps 406, 504 slightly bias the spring fingers 514, 516 outward when the fuse 212 is received into the fuse subassembly 210 so that the terminals 206, 408 are electrically coupled with the end caps 406, 504. When the fuse 212 is loaded into the fuse subassembly 210 and coupled with the terminals 206, 408, the fuse 212 electrically couples the terminals 206, 408 with each other.

The mating segments 508, 510 of the terminals 206, 408 include projecting blades that are shaped to mate with one of the power supply conductive bodies 120 (shown in FIG. 1) of the header subassembly 104 (shown in FIG. 1) and with one of the conductors 114 (shown in FIG. 1), respectively. In the illustrated embodiment, the mating segment 508 of the mating terminal 206 is received in a side channel 518 (shown in FIG. 5) of the fuse insert 400. The mating segments 508, 510 project in opposite directions. The mating segment 508 of the mating terminal 206 projects in a forward direction toward the front end 108 (shown in FIG. 1) of the outer housing 106 (shown in FIG. 1) while the mating segment 510 of the internal terminal 408 projects in a rearward direction toward the back end 110 (shown in FIG. 1) of the outer housing 106.

Figure 6:
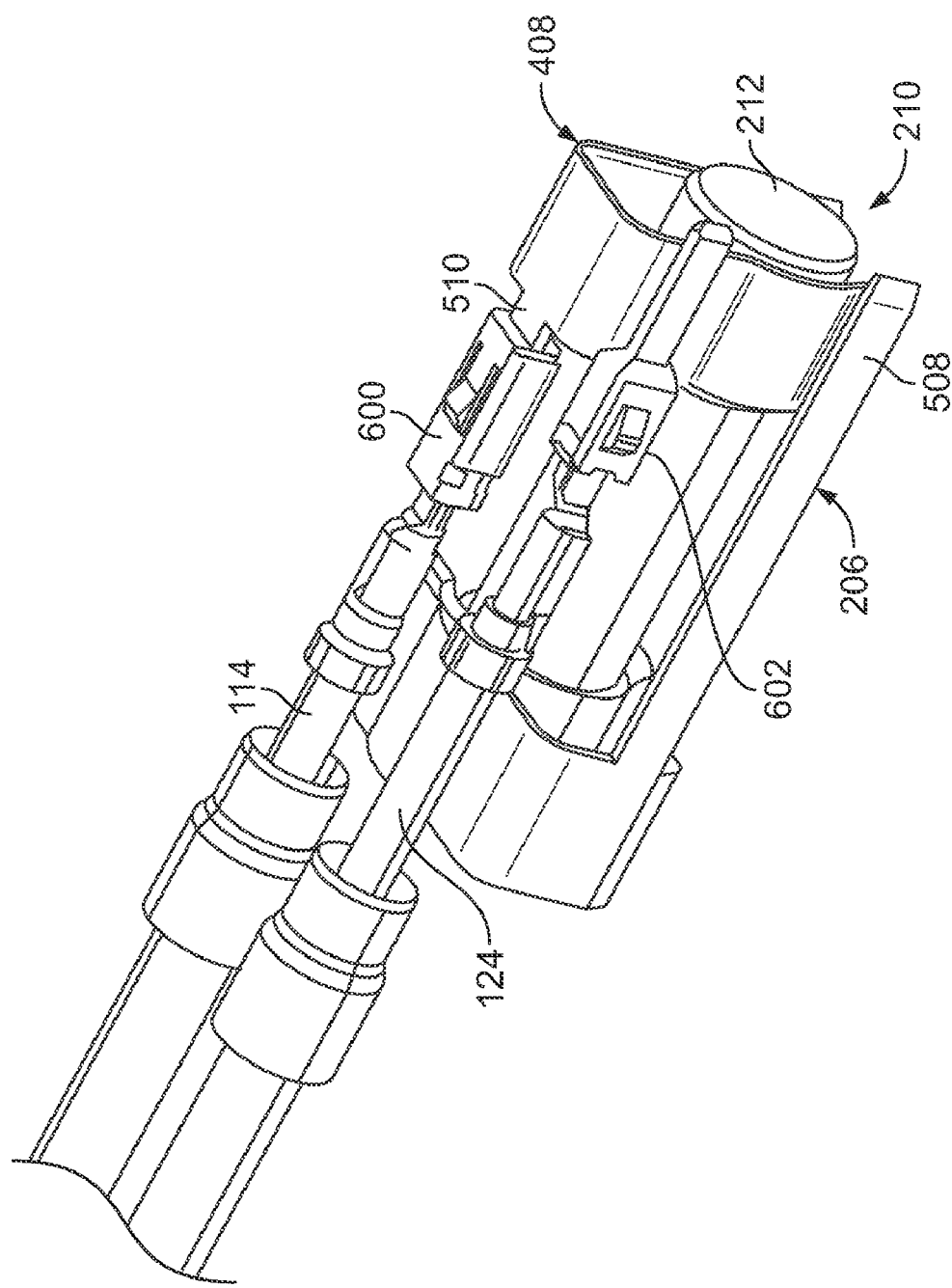
FIG. 6 is a perspective view of one embodiment of the fuse subassembly shown in FIG. 2 and conductors shown in FIG. 1.

FIG. 6 is a perspective view of one embodiment of the fuse subassembly 210 and the conductors 114, 124. The fused conductor 114 may include a receptacle terminal 600 that receives the mating segment 510 of the internal terminal 408 to electrically couple the fused conductor 114 with the fuse subassembly 210. When the fuse 212 is loaded into the fuse subassembly 210 and the mating terminal 206 mates with the power supply conductive body 120 of the header subassembly 104, the fuse subassembly 210 provides a fused conductive pathway that extends through the mating terminal 206, through the fuse 212, and through the internal terminal 408. In the embodiment of the header subassembly 104 shown in FIG. 1, the lower power supply conductive body 120 is a receptacle that is shaped to receive the mating segment 508 of the mating terminal 206. Electric current that flows through this conductive pathway may be conveyed to an electric device (such as the electric device 310 shown in FIG. 3) via the fused conductor 114.

In the illustrated embodiment, the feed through conductor 124 is coupled with a conductive terminal 602 that is received into the receptacle defined by the upper power supply conductive body 120 (shown in FIG. 1) of the header subassembly 104 (shown in FIG. 1). The feed through conductor 124 provides an unfused conductive pathway, or a conductive pathway that does not include a fuse, extending through the connector 102. The feed through conductor 124 may provide a return flow path for current from the electric device 310 (shown in FIG. 3) to the power distribution module 304 (shown in FIG. 3).

Figure 7:
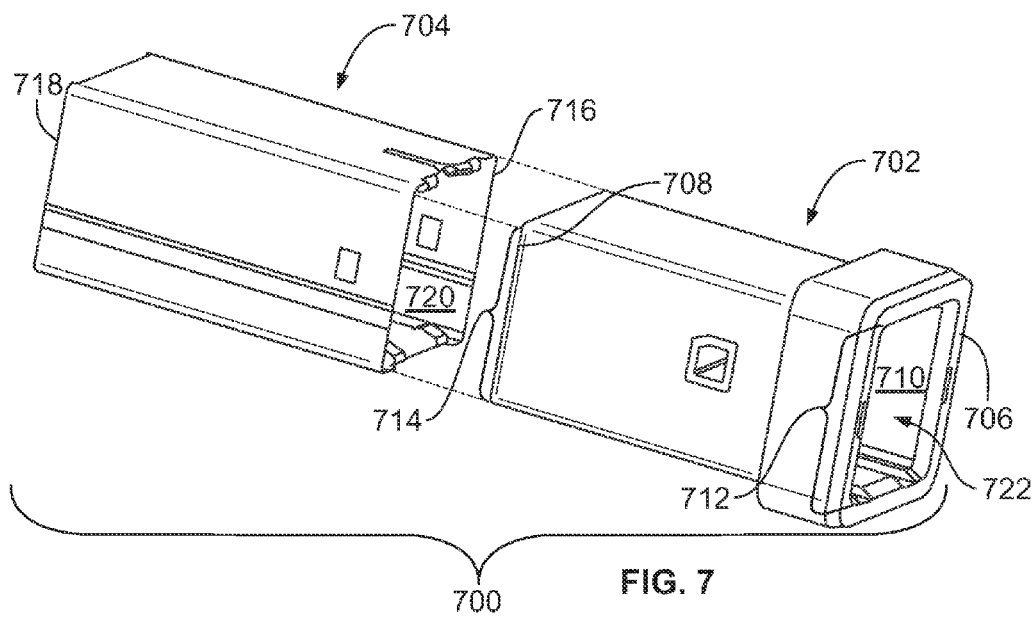
FIG. 7 is an exploded view of an inner housing subassembly in accordance with one embodiment.
Figure 8:
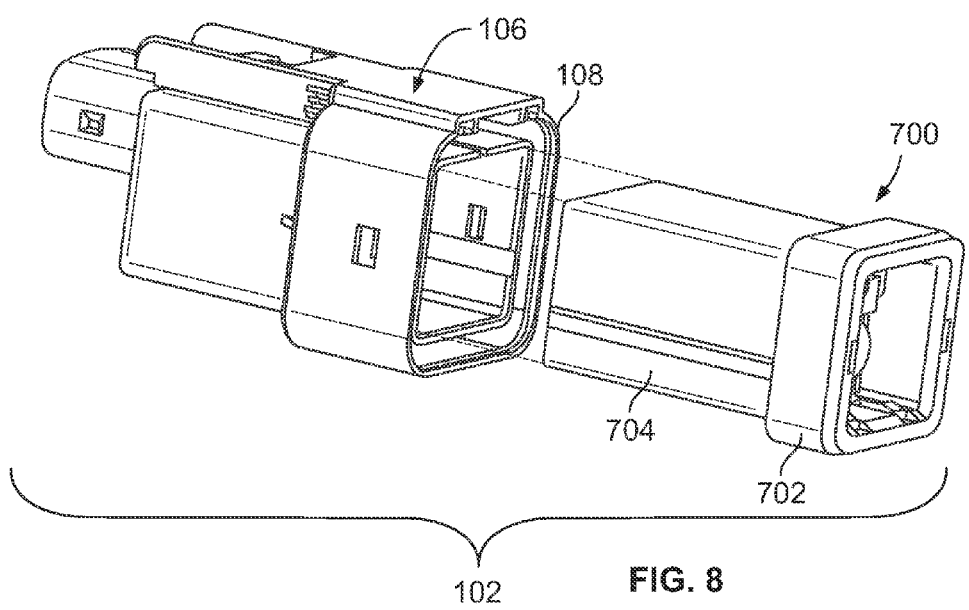
FIG. 8 is an exploded view of one embodiment of the connector shown in FIG. 1.

FIG. 7 is an exploded view of an inner housing subassembly 700 in accordance with one embodiment. FIG. 8 is an exploded view of one embodiment of the connector 102. The inner housing subassembly 700 is included within the connector 102 (shown in FIG. 1) in one embodiment to provide electromagnetic shielding. Alternatively, the inner housing subassembly 700 may not be provided or included in the connector 102. The inner housing subassembly 700 includes an inner housing 702 at least partially disposed within an electrically conductive electromagnetic shield 704. The inner housing 702 may be a dielectric body that extends between opposite ends 706, 708 and that defines an interior chamber 710 between the ends 706, 708.

The fuse subassembly 210 (shown in FIG. 2) may be disposed within the interior chamber 710. In the illustrated embodiment, the power supply conductive bodies 120 (shown in FIG. 1) of the header subassembly 104 (shown in FIG. 1) mate with the mating terminals 204, 206 (shown in FIG. 2) of the connector 102 (shown in FIG. 1) through a front opening 712 that is framed at the front end 706 of the inner housing 702 and that provides access 722 into the interior chamber 710. The cables 112 (shown in FIG. 1) and/or conductors 114, 124 (shown in FIG. 1) may extend out of the inner housing 702 through a rear opening 714 that is disposed at the back end 708 of the inner housing 702 and that is framed by the back end 708. As shown in FIG. 8, the inner housing subassembly 700 is inserted into the outer housing 106 of the connector 102 through the front end 108 of the outer housing 106.

The shield 704 includes, or is formed from, one or more electrically conductive materials, such as a metal or metal alloy. The shield 704 extends between opposite ends 716, 718 and defines an interior chamber 720 between the ends 716, 718. The inner housing 702 is at least partially received into the shield 704, such as by inserting the inner housing 702 into the interior chamber 720 through the front end 716.

The shield 704 provides electromagnetic shielding to protect other electronic components disposed near the connector 102 (shown in FIG. 1) from electromagnetic interference (EMI). For example, the shield 704 may electrically couple to a grounded contact or terminal (not shown) of the header subassembly 104 (shown in FIG. 1), which is electrically joined to a ground reference or a chassis of a vehicle. Electromagnetic interference that is generated when high voltage current (or other current) flows through the fuse subassembly 210 (shown in FIG. 2) and the conductors 114, 124 (shown in FIG. 1) is collected by the conductive body of the shield 704 and conveyed to the ground reference or vehicle chassis via the grounded contact or terminal of the header subassembly 104.

The subject matter described herein provides several embodiments of an in-line fused connector that mates with a header subassembly to close an interlock circuit, such as a high voltage interlock circuit (HVIL), and a power supply circuit, such as a high voltage power supply circuit. The connector electrically couples an external electronic device with a power distribution module that supplies electric current to power the device. In one embodiment, the device is electrically coupled with the power distribution module only by the connector. The power distribution module may be arranged to supply power to several electronic devices at the same time. For example, several connectors may mate or decouple from different header subassemblies of the power distribution module at the same or different times to obtain power from the power distribution module for different electronic devices. The fuse in the connector may be easily replaced by a human operator through the front end of the connector. Alternatively, the fuse may be replaced through another opening of the connector.

Dimensions, types of materials, orientations of the various components, and the number and positions of the various components described herein are intended to define parameters of certain embodiments, and are by no means limiting and are merely examples of several embodiments of the inventive subject matter. Many other embodiments and modifications within the spirit and scope of the claims will be apparent to persons of ordinary skill in the art upon reviewing the above description. The scope of the inventive subject matter described should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An in-line fused connector comprising:
an outer housing having a front end; and
a fuse subassembly disposed in the outer housing, the fuse subassembly including a mating terminal configured to engage a first conductive body of a power distribution module and an internal terminal configured to be electrically coupled with a fused conductor that is configured to be electrically coupled with an electronic device, the mating terminal and the internal terminal shaped to receive a fuse to electrically couple the mating terminal and the internal terminal, wherein electric current that is supplied by the power distribution module is conveyed through the fuse subassembly when the fuse subassembly receives the fuse and the mating terminal of the fuse subassembly mates with the first conductive body of the power distribution module through an opening in the front end of the outer housing, further wherein the fuse is removable from the fuse subassembly through the front end.

2. The connector of claim 1, wherein the front end of the outer housing defines the opening that provides access to the fuse subassembly and the fuse.

3. The connector of claim 1, wherein the fuse subassembly closes a power supply circuit that includes the power distribution module and the electronic device when the fuse subassembly receives the fuse and is electrically coupled with the power distribution module and the electronic device.

4. The connector of claim 1, further comprising a feed through conductor at least partially disposed in the outer housing and configured to be electrically coupled with a second conductive body of the power distribution module, the feed through conductor providing at least part of an unfused conductive pathway between the electronic device and the power distribution module through the outer housing.

5. The connector of claim 1, further comprising an interlock terminal disposed within the outer housing and configured to close an interlock circuit that controls current flow through the connector.

6. The connector of claim 5, wherein the interlock terminal is positioned within the outer housing relative to the fuse subassembly such that the interlock terminal mates with interlock conductors of the power distribution module after the fuse subassembly mates with the first conductive body of the power distribution module.

7. The connector of claim 5, wherein the interlock terminal closes a high voltage interlock (HVIL) circuit when the interlock terminal mates with the interlock conductors of the power distribution module and the fuse subassembly closes a high voltage power supply circuit when the fuse subassembly receives the fuse and mates with the power distribution module and the electronic device.

8. The connector of claim 1, further comprising an electrically conductive electromagnetic shield disposed within the outer housing with the fuse subassembly disposed within the shield.

9. An in-line fused connector comprising:
an outer housing;
an interlock terminal disposed within the outer housing and configured to mate with interlock conductors electrically coupled with a power distribution module to close an interlock circuit;
a fused conductor at least partially disposed in the outer housing and configured to be electrically coupled with an external electronic device; and
a fuse subassembly disposed in the outer housing, the fuse subassembly including a mating terminal and an internal terminal, the mating terminal configured to engage a first conductive body of the power distribution module, the internal terminal electrically coupled with the fused conductor, wherein the fuse subassembly removably receives a fuse that electrically couples the mating terminal and the internal terminal, the fuse subassembly closing a power supply circuit that includes the power distribution module and the electronic device when the fuse is received by the fuse subassembly and the interlock circuit is closed.

10. The connector of claim 9, wherein the fuse subassembly removably receives the fuse between the mating terminal and the internal terminal such that the fuse is removable from the fuse subassembly without withdrawing the fuse subassembly from the outer housing.

11. The connector of claim 9, wherein the fuse subassembly electrically couples the power distribution module with the electronic device through the fuse when the fuse subassembly receives the fuse and is electrically coupled with the power distribution module and the electronic device.

12. The connector of claim 9, wherein the outer housing includes a front end through which the interlock terminal mates with the interlock conductors and the mating terminal of the fuse subassembly mates with the first conductive body of the power distribution module, further wherein the fuse is removable from and loadable into the fuse subassembly through the front end.

13. The connector of claim 9, wherein the interlock terminal is positioned within the outer housing relative to the mating terminal of the fuse subassembly such that the interlock terminal mates with the interlock conductors of the power distribution module after the fuse subassembly mates with the first conductive body of the power distribution module.

14. The connector of claim 9, further comprising a feed through conductor at least partially disposed in the outer housing and configured to be electrically coupled with a second conductive body of the power distribution module as part of the power supply circuit.

15. The connector of claim 9, wherein the interlock terminal closes a high voltage interlock circuit when the interlock terminal mates with the interlock conductors of the power distribution module and the fuse subassembly closes a high voltage power supply circuit when the fuse subassembly receives the fuse and mates with the power distribution module and the electronic device.

16. The connector of claim 9, further comprising an electrically conductive electromagnetic shield disposed within the outer housing with the fuse subassembly disposed within the shield.

17. An in-line fused connector comprising:
an outer housing having a front end that frames an opening;
a fused conductor at least partially disposed in the outer housing, the fused conductor configured to be electrically coupled with an external electronic load; and
a fuse subassembly disposed in the outer housing and including a mating terminal and an internal terminal, the mating terminal configured to engage a first conductive body of a power distribution module through the opening of the outer housing, the internal terminal electrically coupled with the fused conductor, the mating terminal and the internal terminal positioned to removably receive a fuse that electrically couples the mating terminal with the internal terminal to electrically join the power distribution module with the external electronic load, wherein the power distribution module supplies a high voltage current through the fuse subassembly to the external electronic load.

18. The connector of claim 17, wherein the fuse subassembly is positioned in the outer housing such that the fuse is removable from the fuse subassembly through the opening in the front end of the outer housing.

19. The connector of claim 17, wherein the fuse subassembly and the fused conductor close a power supply circuit that supplies electric current from the power distribution module to the electronic load through the fuse.

20. The connector of claim 17, further comprising an interlock terminal disposed within the outer housing and configured to mate with interlock conductors of the power distribution module and close an interlock circuit that controls supply of electric current from the power distribution module to the electronic load.

* * * * *